(12) United States Patent
Hyde et al.

(10) Patent No.: US 8,284,058 B2
(45) Date of Patent: Oct. 9, 2012

(54) ELECTRONIC TAG WITH INDICATOR

(75) Inventors: Roderick A Hyde, Redmond, WA (US);
Muriel Y. Ishikawa, Livermore, CA (US); Jordin T. Kare, Seattle, WA (US); Lowell L. Wood, Jr., Bellevue, WA (US)

(73) Assignee: The Invention Science Fund I, LLC, Bellevue, WA (US)

( * ) Notice: Subject to any disclaimer, the term of this patent is extended or adjusted under 35 U.S.C. 154(b) by 856 days.

(21) Appl. No.: 12/378,479

(22) Filed: Feb. 13, 2009

(65) Prior Publication Data
US 2009/0243832 A1  Oct. 1, 2009

Related U.S. Application Data

(63) Continuation-in-part of application No. 12/077,066, filed on Mar. 14, 2008, and a continuation-in-part of application No. 12/215,674, filed on Jun. 27, 2008, and a continuation-in-part of application No. 12/283,299, filed on Sep. 9, 2008, and a continuation-in-part of application No. 12/290,011, filed on Oct. 23, 2008, and a continuation-in-part of application No. 12/317,928, filed on Dec. 29, 2008.

(51) Int. Cl.
*G08B 13/14* (2006.01)
(52) U.S. Cl. .................... 340/572.1; 340/10.1
(58) Field of Classification Search .... 340/572.1–572.8, 340/10.1
See application file for complete search history.

(56) References Cited

U.S. PATENT DOCUMENTS

| | | | |
|---|---|---|---|
| 4,379,372 A | 4/1983 | Alexander et al. | |
| 4,570,368 A | 2/1986 | Stover | |
| 4,972,616 A | 11/1990 | Doll | |
| 5,339,517 A | 8/1994 | Diemer | |
| 6,597,465 B1 | 7/2003 | Jarchow et al. | |
| 6,671,698 B2 | 12/2003 | Pickett et al. | |
| 6,701,665 B1 | 3/2004 | Ton et al. | |
| 6,745,127 B2 | 6/2004 | Crosby | |
| 6,888,458 B2 * | 5/2005 | Carlson | 340/540 |
| 6,963,881 B2 | 11/2005 | Pickett et al. | |
| 7,076,900 B2 | 7/2006 | Faulkner | |
| 7,080,577 B2 | 7/2006 | Latschbacher et al. | |
| 7,143,066 B2 | 11/2006 | Shear et al. | |
| 7,200,804 B1 | 4/2007 | Khavari et al. | |
| 7,233,250 B2 * | 6/2007 | Forster | 340/572.8 |
| 7,316,202 B2 | 1/2008 | Fantin et al. | |
| 7,403,855 B2 | 7/2008 | Fuessley et al. | |

(Continued)

FOREIGN PATENT DOCUMENTS
JP    2006101739 A    4/2006
(Continued)

OTHER PUBLICATIONS

Data Identifier and Application Identifier Standard, American National Standard, Material Handling Industry (Oct. 9, 2006), pp. 1-110.

(Continued)

*Primary Examiner* — Eric M Blount
(74) *Attorney, Agent, or Firm* — Workman Nydegger

(57) ABSTRACT

An electronic tag may include a human perceptible indicator configured to indicate a need for one or more treatments by at least one corresponding plant.

54 Claims, 9 Drawing Sheets

U.S. PATENT DOCUMENTS

| | | | |
|---|---|---|---|
| 7,702,462 | B2 | 4/2010 | Fuessley et al. |
| 7,761,334 | B2 | 7/2010 | Pickett et al. |
| 7,798,746 | B2 | 9/2010 | Byles |
| 2001/0029996 | A1 | 10/2001 | Robinson |
| 2002/0170229 | A1 | 11/2002 | Ton et al. |
| 2003/0066234 | A1 | 4/2003 | Bussey, Jr. |
| 2004/0088330 | A1 | 5/2004 | Pickett et al. |
| 2004/0088916 | A1 | 5/2004 | Ton et al. |
| 2005/0134461 | A1* | 6/2005 | Gelbman et al. ........... 340/572.8 |
| 2006/0022824 | A1* | 2/2006 | Olsen et al. ................ 340/572.1 |
| 2006/0080819 | A1 | 4/2006 | McAllister |
| 2006/0085266 | A1 | 4/2006 | Wei et al. |
| 2006/0116791 | A1 | 6/2006 | Ravula et al. |
| 2006/0220955 | A1 | 10/2006 | Hamilton |
| 2007/0044445 | A1 | 3/2007 | Spicer et al. |
| 2007/0079536 | A1 | 4/2007 | Hall |
| 2007/0152045 | A1 | 7/2007 | Erickson et al. |
| 2007/0185749 | A1 | 8/2007 | Anderson et al. |
| 2007/0222596 | A1 | 9/2007 | Kleijn et al. |
| 2007/0285229 | A1* | 12/2007 | Batra et al. ............... 340/539.26 |
| 2008/0074254 | A1 | 3/2008 | Townsend et al. |
| 2008/0129497 | A1 | 6/2008 | Woodard et al. |
| 2008/0220721 | A1* | 9/2008 | Downie et al. ............... 455/41.3 |
| 2008/0297350 | A1 | 12/2008 | Iwasa et al. |
| 2009/0042180 | A1 | 2/2009 | Lafferty et al. |
| 2009/0070037 | A1 | 3/2009 | Templeton et al. |
| 2009/0108997 | A1 | 4/2009 | Petterson et al. |
| 2009/0128336 | A1 | 5/2009 | Huang et al. |
| 2009/0319400 | A1* | 12/2009 | Pratt ............................... 705/28 |
| 2010/0283584 | A1 | 11/2010 | McAllister |

FOREIGN PATENT DOCUMENTS

| | | |
|---|---|---|
| WO | WO 2004/023377 A1 | 3/2004 |
| WO | WO 2007/042327 A1 | 4/2007 |

OTHER PUBLICATIONS

Hyde et al.; U.S. Appl. No. 12/077,066, filed Mar. 14, 2008.
Hyde et al.; U.S. Appl. No. 12/215,674, filed Jun. 27, 2008.
Hyde et al; U.S. Appl. No. 12/283,299, filed Sep. 9, 2008.
Hyde et al; U.S. Appl. No. 12/290,011, filed Oct. 23, 2008.
Hyde et al; U.S. Appl. No. 12/317,928, filed Dec. 29, 2008.

* cited by examiner

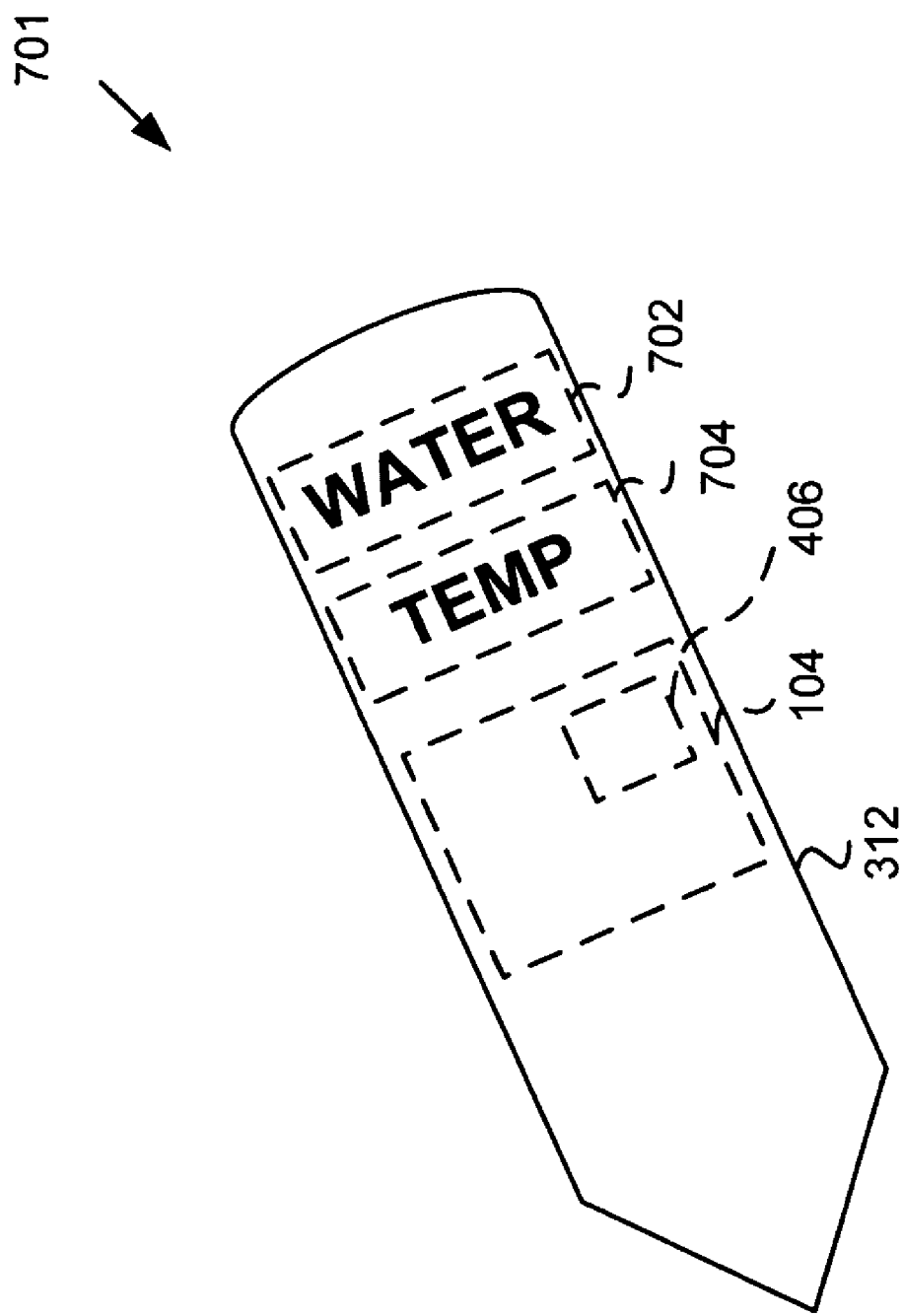

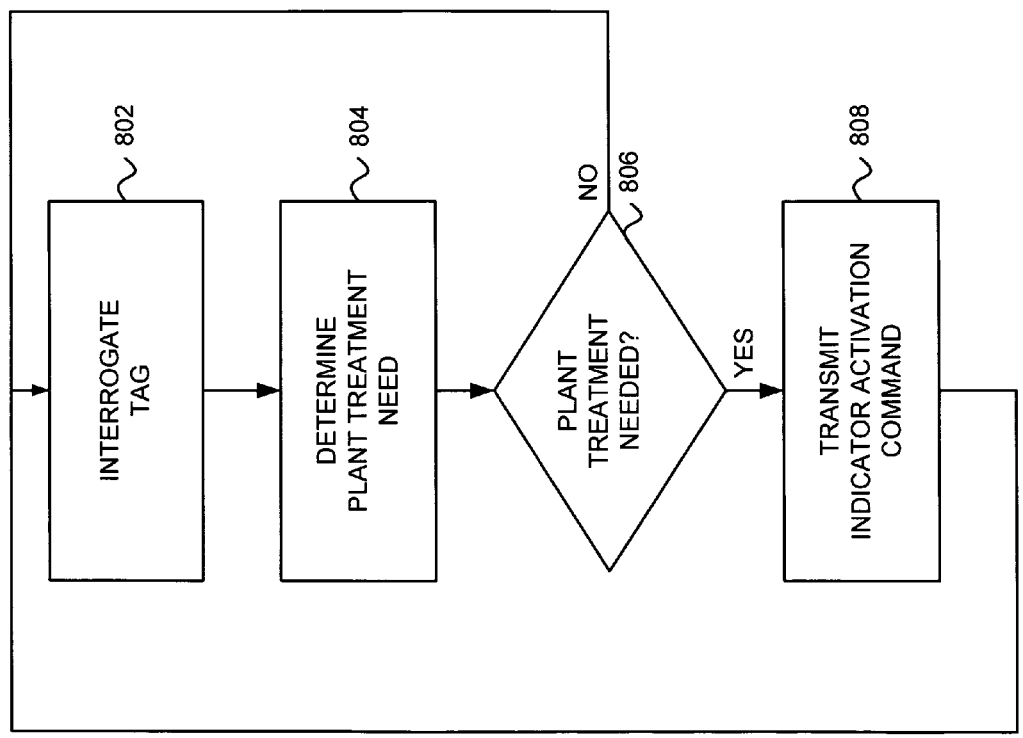

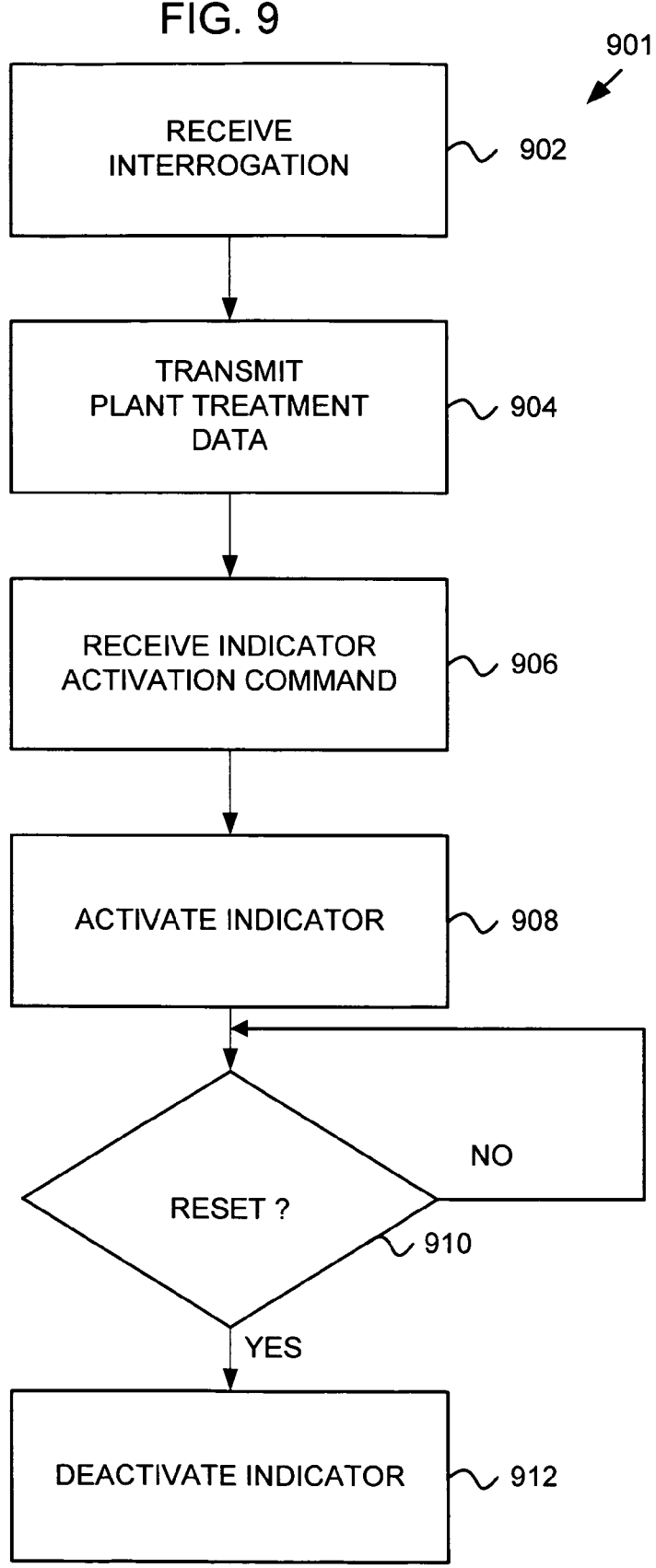

ELECTRONIC TAG WITH INDICATOR

CROSS-REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)).

RELATED APPLICATIONS

For purposes of the USPTO extra-statutory requirements, the present application constitutes a continuation-in-part of U.S. patent application Ser. No. 12/077,066, entitled METHOD AND APPARATUS FOR TRACKING PLANTS WITH AN ELECTRONIC TAG, naming Roderick A. Hyde, Muriel Y. Ishikawa, Jordin T. Kare, and Lowell L. Wood, Jr. as inventors, filed Mar. 14, 2008, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/215,674, entitled METHOD AND SYSTEM FOR CORRELATING EXTERNAL DATA TO A PLANT WITH AN ELECTRONIC TAG, naming Roderick A. Hyde, Muriel Y. Ishikawa, Jordin T. Kare, and Lowell L. Wood, Jr. as inventors, filed Jun. 27, 2008, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/283,299, entitled ELECTRONIC TAG AND METHOD FOR USING AN ELECTRONIC TAG CONFIGURED TO TRACK AT LEAST ONE PLANT, naming Roderick A. Hyde, Muriel Y. Ishikawa, Jordin T. Kare, and Lowell L. Wood, Jr. as inventors, filed Sep. 9, 2008, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/290,011, entitled ELECTRONIC TAG CONFIGURED TO SENSE A PLANT ENVIRONMENT, naming Roderick A. Hyde, Muriel Y. Ishikawa, Jordin T. Kare, and Lowell L. Wood, Jr. as inventors, filed Oct. 23, 2008, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/317,928, entitled SYSTEM FOR TREATING AT LEAST ONE PLANT INCLUDING A TREATMENT APPARATUS AND AN ELECTRONIC TAG INTERROGATOR, naming Roderick A. Hyde, Muriel Y. Ishikawa, Jordin T. Kare, and Lowell L. Wood, Jr. as inventors, filed Dec. 29, 2008, which is currently co-pending, or is an application of which a currently co-pending application is entitled to the benefit of the filing date.

The United States Patent Office (USPTO) has published a notice to the effect that the USPTO's computer programs require that patent applicants reference both a serial number and indicate whether an application is a continuation or continuation-in-part. Stephen G. Kunin, Benefit of Prior-Filed Application, USPTO Official Gazette Mar. 18, 2003, available at http://www.uspto.gov/web/offices/com/sol/og/2003/week11/patbene.htm. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant is designating the present application as a continuation-in-part of its parent applications as set forth above, but expressly points out that such designations are not to be construed in any way as any type of commentary and/or admission as to whether or not the present application contains any new matter in addition to the matter of its parent application(s).

All subject matter of the Related Applications and of any and all parent, grandparent, great-grandparent, etc. applications of the Related Applications is incorporated herein by reference to the extent such subject matter is not inconsistent herewith.

SUMMARY

According to an embodiment, an electronic tag includes an actuatable indicator configured to provide human-perceptible indication of a need for treatment by at least one corresponding plant. According to embodiments, the indicator may be configured to provide one or more of a visible, audible, and/or vibratory indication to a human in the vicinity of the at least one plant. The indicator may be configured to provide an indication of the type of treatment needed, a priority for the treatment, and/or a timing of the treatment.

According to an embodiment a method for treating one or more plants includes actuating a human-perceptible indicator operatively coupled to an electronic tag located in a position corresponding to the one or more plants.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

FIG. 7 is a view of an electronic tag including an indicator in a package configured to be coupled to at least one plant, according to an embodiment.

FIG. 8 is a flowchart showing a process for interrogating one or more electronic tags and providing a human perceptible indication of electronic tags corresponding to plants in need of a treatment, according to an embodiment.

FIG. 9 is a flow chart showing a process used by an electronic tag to provide human perceptible indication of a need for one or more treatments by corresponding one or more plants, according to an embodiment.

DETAILED DESCRIPTION

Figure 1:
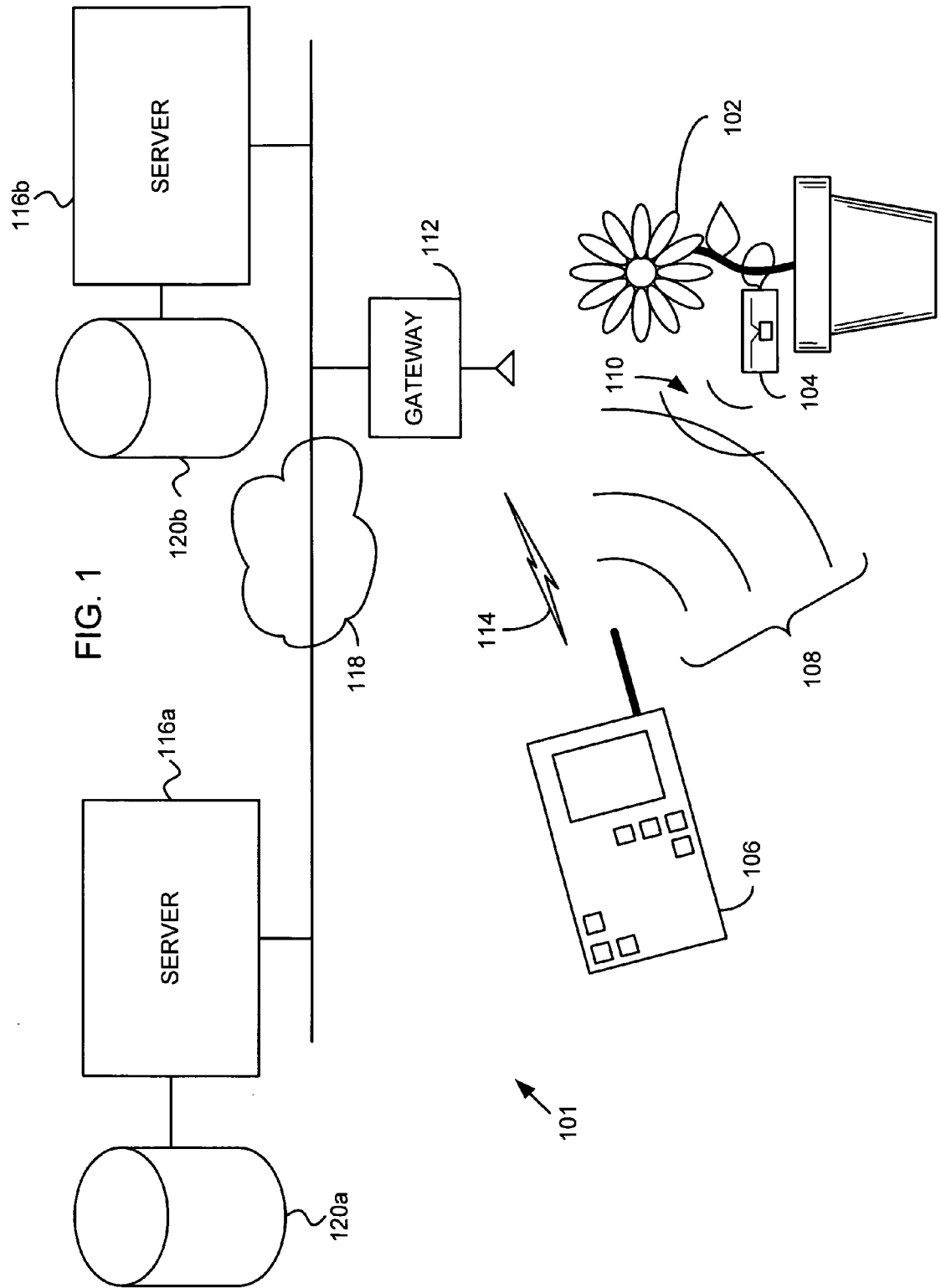
FIG. 1 is an illustrative diagram of a system configured to interface to one or more populations of electronic tags and for performing methods described herein.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

FIG. 1 is an illustrative diagram of a system 101 for interfacing to one or more electronic tags 104 coupled to one or more plants 102 according to an embodiment. An electronic tag interrogator 106 may interrogate the electronic tag 104 to receive identification data corresponding to the at least one plant 102. For example, the electronic tag interrogator 106 may include a radio frequency identification (RFID) interrogator that is configured to emit an interrogation field 108 including a radio frequency signal to illuminate one or more radio frequency tags (RF tags) 104. The interrogation field or interrogation signal 108 may be modulated with an appropriate pattern for evoking a response 110 from the RF tag 104. According to some embodiments, the electronic tag interrogator may be in the form of a hand-held and/or portable apparatus that may optionally be in communication with a remote device 112 via a communication signal 114. For example, the remote device 112 may include a gateway, host computer, etc. configured to communicate with the electronic tag interrogator 106 via a radio communication signal 114.

According to an embodiment, the remote device 112 may be operatively coupled to a second remote device 116a, such as a server, over a network 118. The second remote device 116a may include a storage apparatus 120a configured to store at least a portion of a database including information corresponding to the identification data from the electronic tag 104 and the associated at least one plant 102. The remote device 112 may be operatively coupled to a third remote device 116b such as a server, over the network 118. The third remote device 116b may also include a storage apparatus 120b configured to store at least a portion of a database including information corresponding to the identification data from the electronic tag 104 and the associated at least one plant 102.

Embodiments of electronic tags may include user-writable memory. The memory contents may be determined by the user. The user may structure data in the memory according to open or closed standards. According to some embodiments, the memory of the electronic tag may include data structured for access by a plurality of trading partners. As will be described additionally below, electronic tags may be configured to remain with at least one plant 102 while the at least one plant 102 proceeds to market.

The electronic tag 104 may, for example, include various types of electronic tags including a radio frequency tag, such as a passive radio frequency tag, an active radio frequency tag, a backscatter radio frequency tag, a half-duplex radio frequency tag, or a full-duplex radio frequency tag, for example; a touch memory device; a proximity card; a smart card; a photonic tag; etc. Accordingly, the interrogation signal 108 and response signal 110 may include corresponding forms such as radio frequency interrogation and response, touch memory interrogation and response, proximity card interrogation and response, smart card interrogation and response, etc.

Additionally, electronic tags may include read-only, read/write, and write-once-read-many-times (WORM) capabilities. In the case of a writable tag technology such as a read/write or WORM, the relationship shown diagrammatically in FIG. 1 may include writing data from the interrogator 106 to the electronic tag 104 via the interrogation signal 108 and response 110. According to an embodiment, the interrogator 106 may write to the electronic tag 104 identification data and/or one or more external data coordinates and/or other data associated with accessing external data related to the at least one plant 102.

While the at least one plant 102 is illustrated as a single plant in a pot, other forms are contemplated such as flats, rows, pallets, bare root, root ball, groupings, arrangements, beddings, portable gardens, etc.

The at least one plant may include at least one seed, cutting, rhizome, bulb, corm, tuber, annual, biennial, cut flower, perennial, grass, creeper, climber, vine, fern, shrub, bush, or tree.

Figure 2:
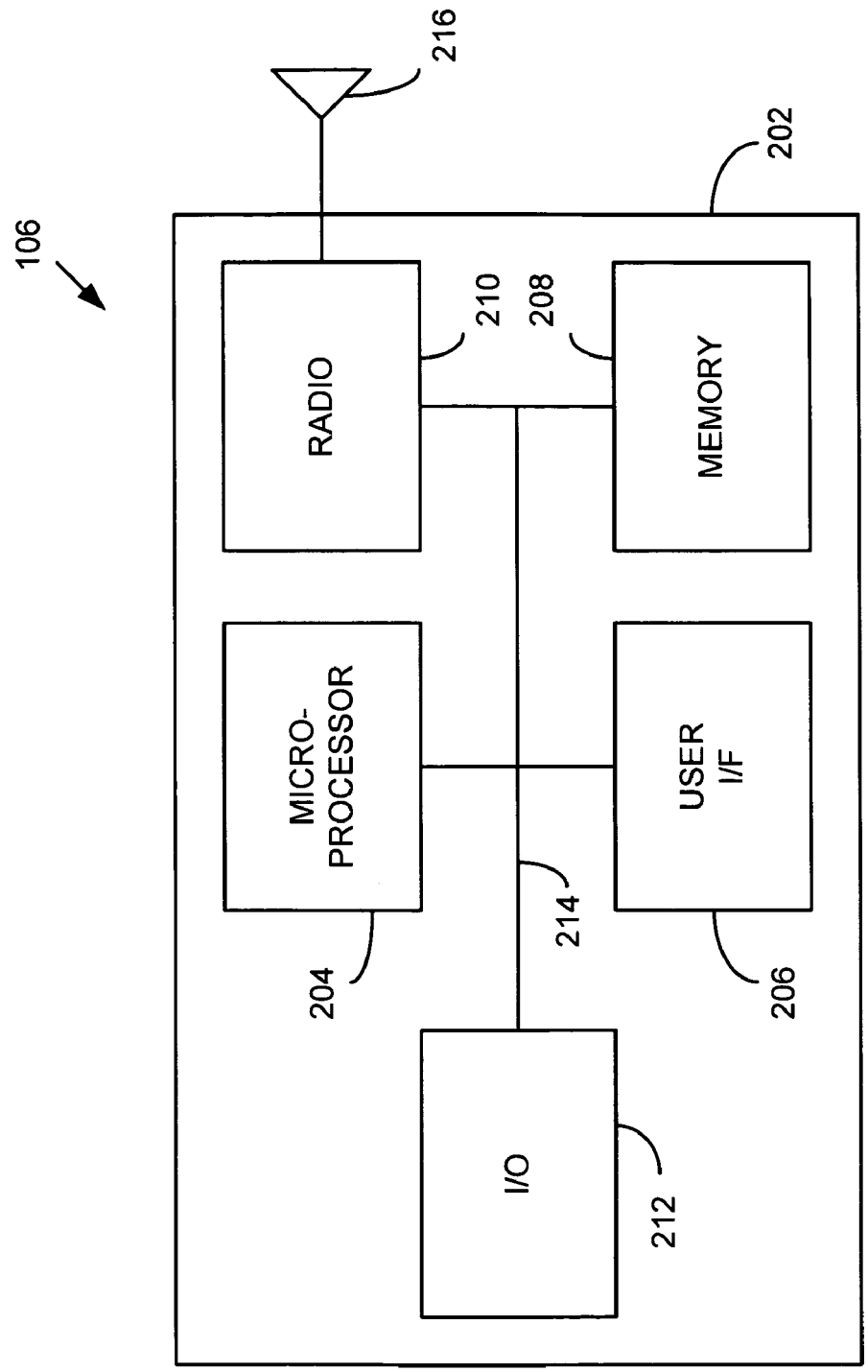
FIG. 2 is a block diagram of an illustrative electronic tag interrogator as depicted in FIG. 1, according to an embodiment.

FIG. 2 is a block diagram of an illustrative electronic tag interrogator 106 as depicted in FIG. 1, according to an embodiment. The electronic tag interrogator 106 may be embodied, for example, as an RF tag interrogator. The interrogator 106 may include a housing 202 substantially enclosing a microprocessor 204, user interface 206, memory circuitry 208, a radio configured to interrogate one or more types of RF tags, and an interface 212 operatively connected by one or more data buses 214. The radio 210 may include one or more antennas 216 operable to illuminate one or more RF tags with an interrogation field and receive a response signal from the one or more RF tags. The interface 212 may itself include a radio configured for communication with a host computer or computer network.

The interrogator 106 may be operable to run a computer program such as a data parsing program configured to parse data pertaining to one or more plants from one or more RF tags, and determine one or more external data coordinates corresponding to a database holding information corresponding to the data. Additionally or alternatively, the interrogator 106 may be operable to transmit received data over the interface 212 to a remote processing resource 112, 116a, 116b and receive information corresponding to the at least one plant (not shown) from the remote processing resource.

According to an illustrative embodiment, the RF tag interrogator 106 may receive a command such as a trigger pull through the user interface 206, interrogate an RF tag associated with at least one plant (not shown) with the radio 210 and at least one antenna 216 to receive data corresponding to the at least one plant, temporarily write received data to workspace in the memory circuitry 208, and execute a program from memory circuitry 208 with the microprocessor 204 to determine a location of an external resource for performing a query of or writing data to an external database.

Referring back to FIG. 1, one or more external resources or servers 120a, 120b may provide logical linkages between electronic tags 104, databases for storing data corresponding to the at least one population of at least one plants, tag population query nodes or other functions. The two or more external resources 120a, 120b may each include a portion of information related to the at least one plant. Alternatively, the two or more external resources 120a, 120b may represent a plurality of potential resources for storing or retrieving data related to the at least one plant, supporting networked query functions, and provide other resources related to reading, writing, and tracking.

Each external resource 120a, 120b that includes data disposed therein related to at least one plant includes the data also disposed on the database for identifying a portion of the database corresponding to the at least one plant.

The electronic tag interrogator 106 may include a computer program configured to store additional data corresponding to a record of additional treatments provided to the at least one plant upon such treatment application. The electronic tag interrogator 106 may include a computer program configured to retrieve from the database at least a portion of the data corresponding to the care of the at least one plant and determine whether a treatment is scheduled to be provided to the at least one plant. The electronic tag interrogator 106 may provide an indication to administer the treatment to the at least one plant if the treatment is scheduled. Upon receiving acknowledgement of the treatment being provided, the electronic tag interrogator 106 may then store in the database data corresponding to a record of providing the treatment.

The electronic tag interrogator 106 may further store location data in an industry accessible registry, the location data corresponding to an address for accessing the database. For example, server 120a may be a resource that provides the database for storing treatment information for plants, and server 120b may be a resource that provides a database for storing one or more locations of server(s) 120a, where multiple instances of servers 120a are accessible for query and/or writing.

Referring to FIG. 1, a software program running on server 120a may associate in a database 116a data corresponding to the care of at least one plant 102 with data identifying the at least one plant 102. The data identifying the at least one plant 102 may be retained in an electronic identification tag 104 associated with each at least one plant 102. The data corresponding to the care of the at least one plant 102 may include plant care instructions or a record of at least one plant care treatment provided to the at least one plant 102.

For embodiments where the electronic tag 104 is writable, the electronic tag interrogator 106 may write to the electronic identification tag 104 a location corresponding to the database 116a where related data is disposed. Additionally or alternatively, the external resource 120a, the electronic tag interrogator 106, or another computing resource may transmit to a second resource 120b at least a portion of the data identifying the at least one plant and data corresponding to the location of the first database 116b for storage on the second database 116b. The data corresponding to the location of the first database 116a may be an accessible address such as an IP address or a URL from which the data corresponding to the care of the at least one plant may be retrieved.

Other embodiments may include additional or reduced functionality in the interrogator 106, may rely on increased or reduced functionality in an external resource, may be operated by a user or operate automatically, may be interfaced to a treatment device to detect treatments, and/or may rely on alternative interrogation technologies. The interface 212 may include a wired interface and/or an intermittent interface such as a memory stick, USB drive, or other detachable memory.

Figure 3:
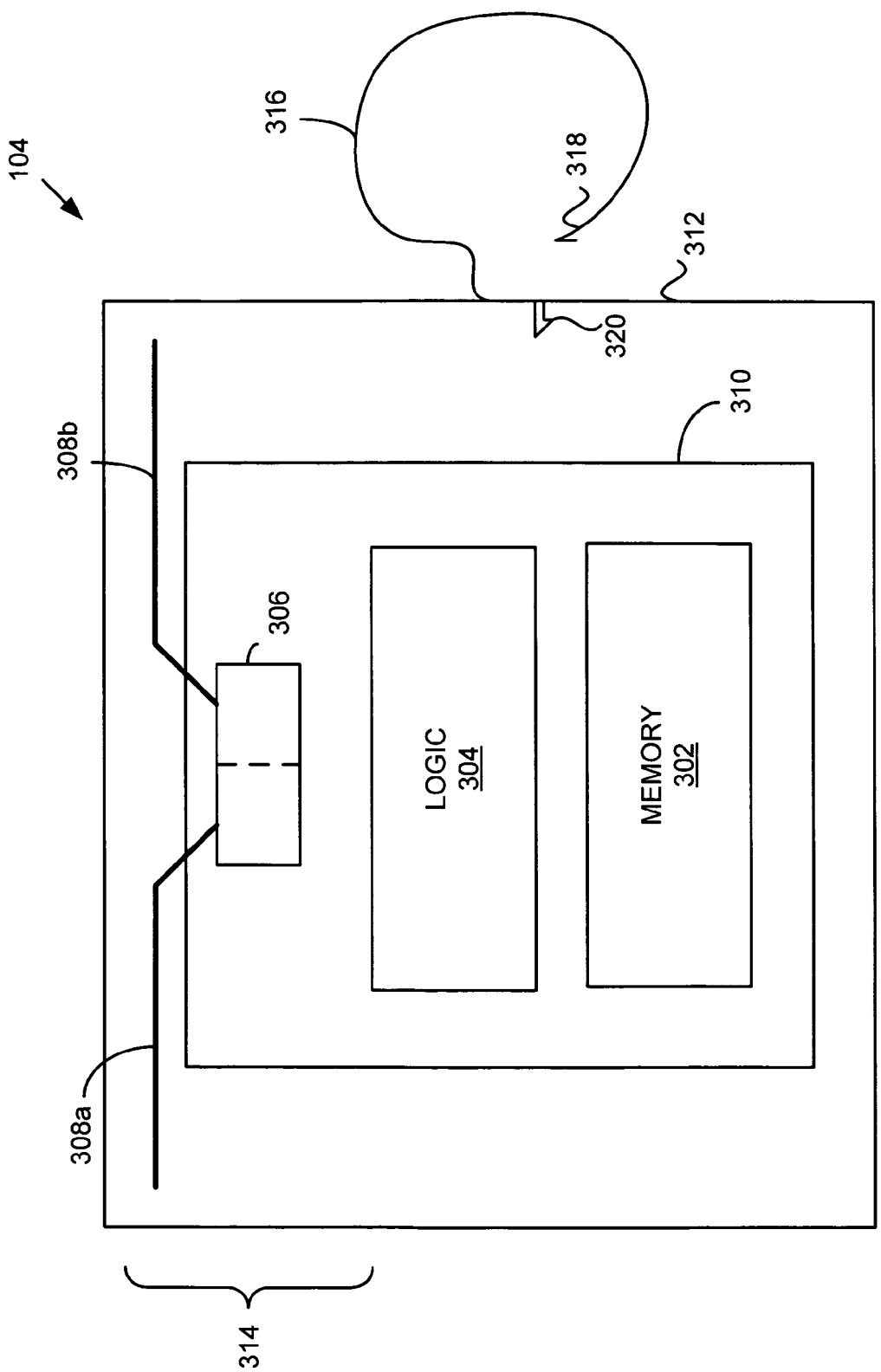
FIG. 3 is a block diagram of an illustrative electronic tag as depicted in FIG. 1, according to an embodiment.

FIG. 3 is a block diagram of an illustrative electronic tag 104 as depicted in FIG. 1, according to an embodiment wherein the electronic tag is in the form of a radio frequency (RF) tag. The RF tag 104 includes a memory circuit 302 (which may be read/write, WORM, or read-only, for example) and a logic circuit 304 operatively coupled to the memory circuit 302. A radio frequency transceiver 306 is operatively coupled to the logic circuit 304. The radio frequency transceiver may be further coupled to an antenna 308a, 308b which may include two respective antenna segments 308a and 308b. The radio frequency transceiver 306 may be configured to provide a switched connection between the antenna segments 308a and 308b. According to an embodiment, the memory circuit 302, logic circuit 304, and transceiver 306 may be formed on a die 310 as an integrated circuit. The integrated circuit 310 and the antenna 308a, 308b may be disposed in a package 312 that may include a printed circuit, for example.

The antenna 308a, 308b, transceiver 306, and optionally at least a portion of the logic circuit 304 may provide an interrogation interface 314 configured to communicate with an external interrogator (not shown). According to an embodiment, the transceiver 306 may hold the antenna portions 308a and 308b in substantial continuity during a first portion of a communication session. During the first portion of the communication session, an interrogation signal (not shown) in the form of radio frequency illumination may be received by the antenna 308a, 308b. In the case of a passive electronic tag 104, the radio frequency illumination may provide an AC voltage that is rectified by a portion of the transceiver 306 and used to charge one or more capacitors (not shown) that in turn provide DC power rails to operate the transceiver 306, logic 304, and memory 302. When the interrogation signal is received, the capacitor(s) charge and the transceiver 306, logic 304, and optionally the memory 302 may be powered up. According to some embodiments, it may be advantageous to power up only portions of the electronic tag 104 as the portions are needed.

Various messages may be encoded on the interrogation field. For example, one message may request tag ID, such as a segment of data by which the unique identity of the electronic tag 104 may be identified. Another message may specify a tag ID and request a portion or more of data held in the memory 302 of the particular electronic tag associated with the tag ID. According to one embodiment, the electronic tag 104 may respond to a data request in half-duplex as a backscatter signal.

For example, the electronic tag 104 may receive a request for at least a portion of data from the memory 302 over a modulated interrogation field (not shown) during a first portion of the communication session. The interrogator (not shown) may then cease to modulate the interrogation signal but maintain illumination of the signal onto the antenna 308a, 308b. The logic circuit 304 (powered by the illumination provided by the interrogation signal) then fetches the requested portion of data from the memory 302 and outputs the data to the transceiver 306. The transceiver 306 selectively couples and uncouples the portions of the antenna 308a, 308b in a pattern corresponding to the data received from the logic 304. The selective coupling and uncoupling of the antenna portions 308a, 308b creates a corresponding variation in reflectivity to the radio frequency illumination provided by the antenna. The variation in reflection may then be detected by the interrogator (not shown) and converted into data corresponding to the data fetched from memory 302.

Of course, substantial handshaking, error correction, and other interactions between the interrogation signal (not shown) and the response signal (not shown) may be used to improve communication reliability, extend range, and/or provide other capabilities.

Similarly, data may be written from an interrogator (not shown) to the memory 302 of an electronic tag 104 using a similar approach. Data that may be written to and/or read from the memory 302 an electronic tag 104 may include a range of contents. For example, the data may include an identifier corresponding to the at least one plant and/or one or more data coordinates referencing external data locations corresponding to the at least one plant.

According to an embodiment, the package 312 may include encapsulation or other form of protection for the circuitry and/or antenna. The package 312 may include a coupling 316 configured to couple to at least one plant to attachment to a plant (not shown). In the example of FIGS. 1 and 3, the coupling 316 may include a loop such as a "zip tie" or lanyard that provides a permanent or semi-permanent association with a plant or a group of plants. According to an embodiment, the coupling 316 may be formed integrally with the package 312 for convenient attachment to one or more plants.

The coupling 316 may be embodied as a lanyard 316 having a coupling tip 318. The coupling tip 318 may be configured to insert into and be retained by a corresponding coupling socket 320 formed in the electronic tag package 312 to effectively form an attachment to the at least one plant 102.

Figure 4:
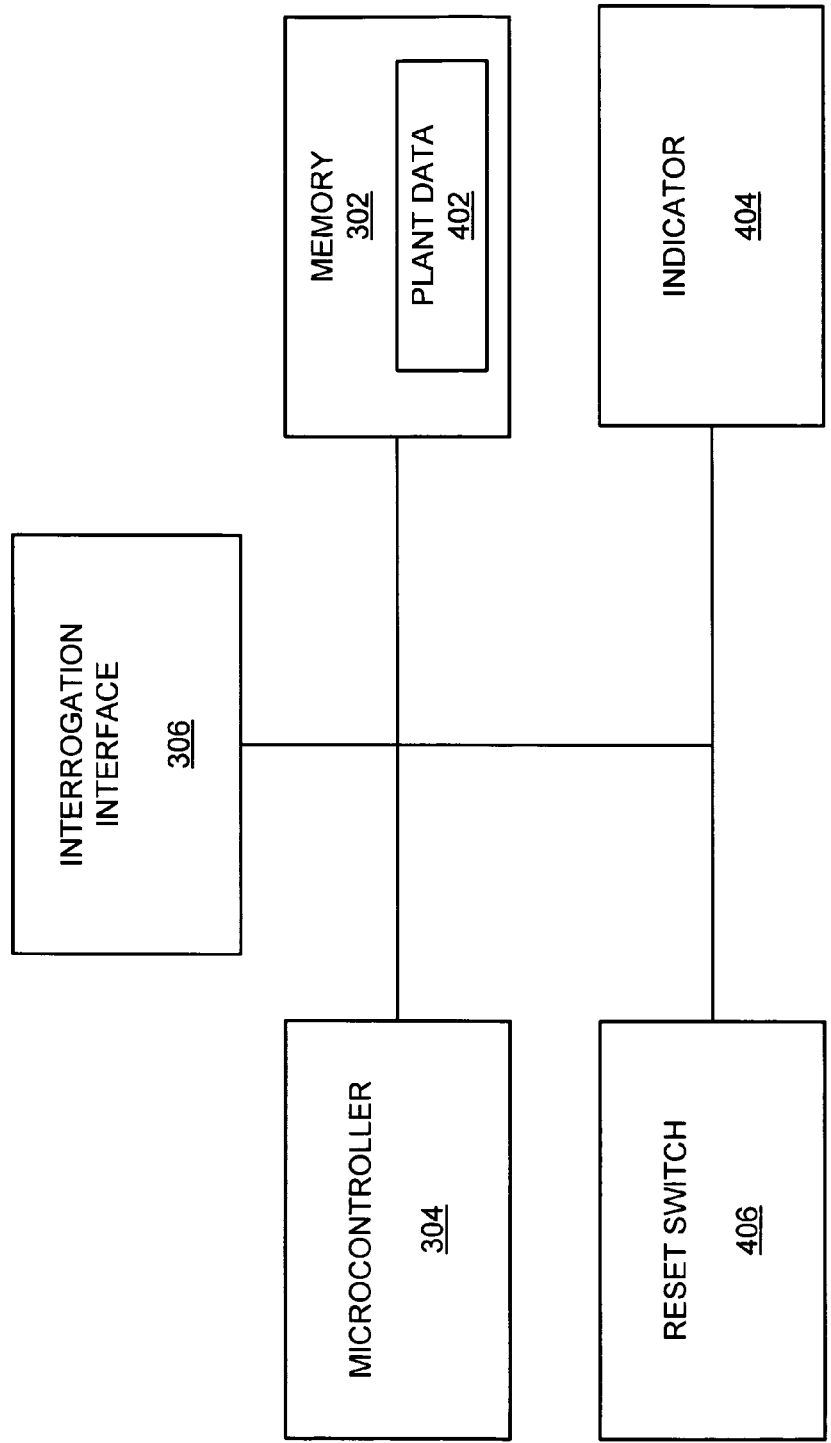
FIG. 4 is a block diagram of an electronic tag for tracking at least one plant, wherein the electronic tag includes a human-perceptible actuatable indicator, according to an embodiment.

FIG. 4 is a block diagram of an electronic tag 401 including a human-perceivable indicator for tracking at least one plant, according to an embodiment. The electronic tag 401 includes an interrogation interface 306 and a memory circuit 302 operatively coupled to the interrogation interface 306. The memory circuit 302 may carry plant data 402 corresponding to at least one plant. The electronic tag 401 further includes an actuatable indicator 404 operatively coupled to at least one of the interrogation interface 306 and the memory circuit 302.

The data corresponding to at least one plant 402 may, for example, include data corresponding to receipt of a treatment such as watering, fertilizing, etc. For example, the data corresponding to receipt of a treatment may include data corresponding to a date or a time when the treatment was last received by the at least one plant.

The electronic tag 401 may further include a microcontroller 304 operatively coupled to the interrogation interface 306, the memory circuit 302, and the actuatable indicator 404. The microcontroller 304 in some embodiments may be limited to relatively rudimentary logic functions, such as responsive to commands received through the interrogation interface. A simple microcontroller 304 may, for example, be integrated into the interrogation interface 306, or may be formed from one or more state machines or other types of simple logic. According to other embodiments, the microcontroller 304 may include somewhat more advanced capability, such as the ability to initiate and/or perform multi-step computer instructions.

The microcontroller 304 may be configured to selectively activate the indicator 404. As described below, according to various embodiments, the microcontroller 304 may be configured to activate the indicator 404 in response to commands received through the interrogation interface 306, may be configured to activate the indicator 404 in response to one or more events internal to the electronic tag 401 and/or the environment, and/or may be configured to activate the indicator 404 in response to logical relationships between commands received through the interrogation interface 306 and one or more events internal to the electronic tag 401 and/or the environment.

For example, the data 402 corresponding to the at least one plant may include a count value and the microcontroller 304 may be configured to modify the count value when time passes. The microcontroller 304 may be configured to activate the indicator 404 when the count value reaches a limit. For example, the microcontroller 304 may operate a countdown timer. According to an embodiment, the microcontroller 304 may be configured to modify the count value 402 in the memory circuit 302 responsive to a tick received through the interrogation interface 306.

The actuatable indicator 404 may be configured to receive an activation signal from the microcontroller 304 and/or from the interrogation interface 306. The actuatable indicator 404 may, for example, include an indicator configured to receive electrical or magnetic activation from the microcontroller 304 responsive to a command received through the interrogation interface 306, or may be configured to receive electrical or magnetic activation substantially directly from the interrogation interface 306.

Various types of human-perceivable activatable indicators 404 may be included in the electronic tag 401. For example, the indicator may include at least one of a visible indicator, an audible indicator, a scent generator, and/or a vibrator. Visible indicators may include one or more of a liquid crystal indicator, a light emitting diode indicator, an electrochromic indicator, a bistable visible indicator, an extendible apparatus, and/or an extendible apparatus with a visible pattern. An audible indicator may include one or more of a piezo-electric device, a magnetic driver, a voice coil, and/or an electrostatic driver.

The indicator 404 may be configured to provide information related to a type of treatment requested for the plant. The indicator 404 may be configured to provide information related to a time of treatment requested for the plant. The indicator 404 may be configured to provide information related to a priority of treatment requested for the plant.

According to embodiments, the indicator may be configured to draw power from an interrogation signal. Referring back to FIG. 1, for example, an interrogation field 108 may include electromagnetic energy that may illuminate an electronic tag 104. Alternatively, a contact interrogator may conduct energy to an electronic tag. Referring again to FIG. 4, the energy from the interrogation field 108 or conducted energy may be converted by the electronic tag 104 into energy to drive the indicator 404. For example, the indicator 404 may be configured to draw power through the interrogation interface 306 when activating and to maintain an indication when the interrogator signal is not in communication with the interrogation interface 306.

For example, a bi-stable visible indicator such as an array of dipole beads be normally in a state where a white side of the beads are oriented toward a viewer, activated to turn a black side of the beads toward the viewer, and then maintain that position without additional power input. The bi-stable visible indicator may similarly "turned off" by applying power during switching and then maintaining the bead orientation (e.g. white side forward) without application of additional power.

Alternatively, an indicator 404 may continue to draw power from an illuminating interrogation field when the field is not in logical communication with the electronic tag 401. For example, electro-chromic systems are known to maintain color with very low power consumption. Activation of an electro-chromic indicator 404 may include switching one or more terminals of the electro-chromic indicator into communication with power conversion circuitry in the interrogation interface 306. When the interrogation field illuminates the interrogation interface 306, electrical energy received from the field may be rectified and a potential applied across the electro-chromic material in the indicator 404. The electro-chromic material may thus remain in an "on" state as long as an interrogation field illuminates the electronic tag 401. If the electrical connection between the interrogation interface 306 and the indicator 404 is persistent, the indicator 404 may become non-indicating when the interrogation field is not present, but then resume indicating when the interrogation field is returned.

Alternatively, the electronic tag 401 may include a battery, capacitor, or other source of power to power the indicator 404.

Optionally, the electronic tag 401 may include a reset switch 406 configured to switch the indicator to a non-indicating state. For example, the reset switch 406 may include a human-activatable button. Accordingly, when a worker provides an indicated treatment, the worker may physically reset the electronic tag 401 into a non-indicating state.

The reset switch may optionally be integrated into the indicator. For example, when an indicator 404 includes an extendible rod or flag, resetting may include pressing the rod or flag back into its non-indicating position. The act of resetting may optionally store energy in a spring. Subsequent activation of the indicator 404 may include releasing a restraint mechanism to allow the spring to again extend the indicator. Such an approach may be useful in low power applications (such as passive RF tags) where treatment includes physical presence of a worker. Activation of the indicator 404 may consume very little power because it involves tripping a mechanism to release energy already stored in the spring. Maintaining the indication may consume substantially no energy.

Optionally, the electronic tag 401 may sense activation of the reset switch 406 and responsively reset an internal timer and/or subsequently communicate the act of resetting via the interrogation interface 306.

Figure 5:
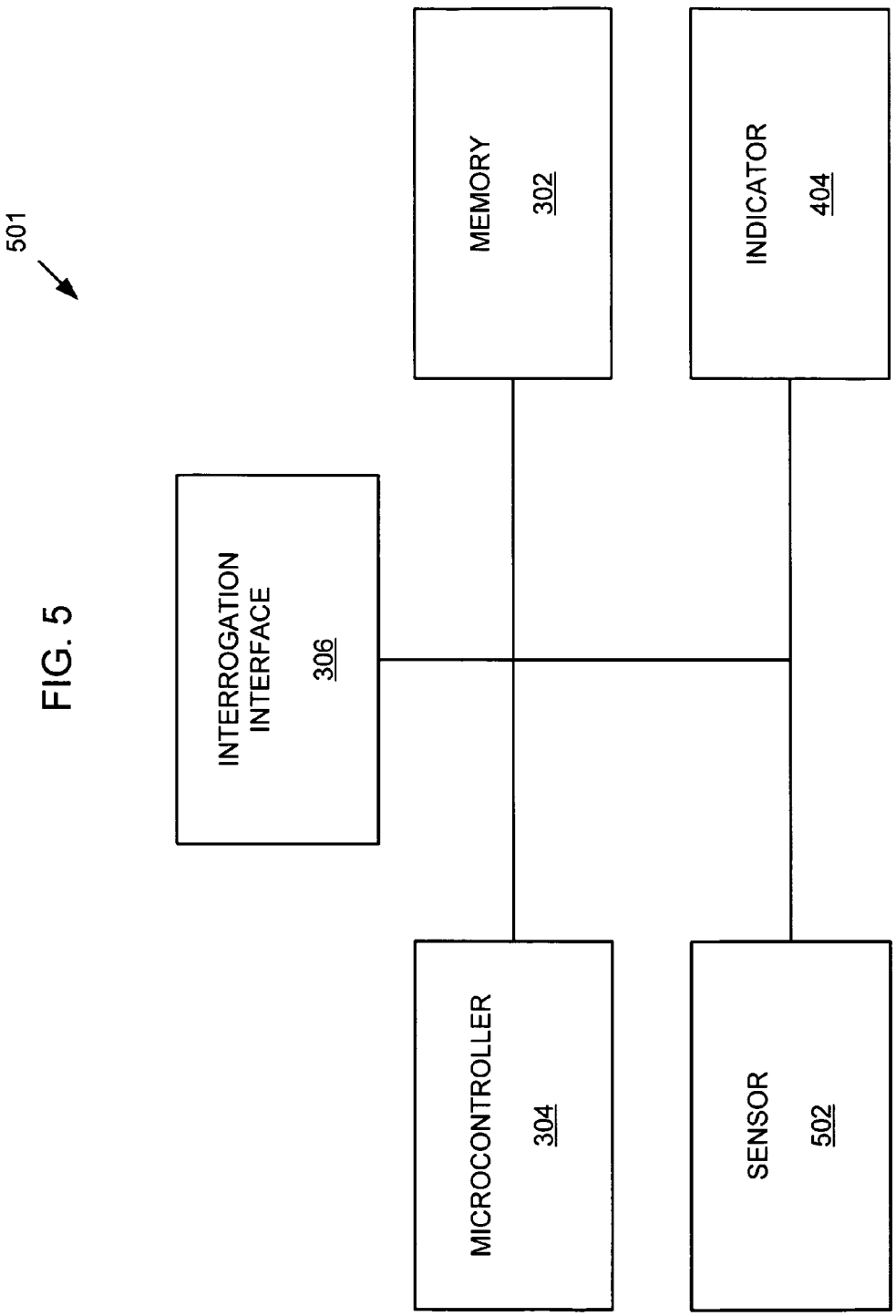
FIG. 5 is a block diagram of an electronic tag including at least one sensor and an indicator, the sensor being configured to sense at least one parameter corresponding to a plant environment, according to an embodiment.

FIG. 5 is a block diagram of an electronic tag 501 including at least one sensor 502 and an indicator 404 operatively coupled to the microcontroller 304, the sensor 502 being configured to sense at least one parameter corresponding to a plant environment, according to an embodiment.

For example, a system (not shown) may interrogate the electronic tag 501 and send a command to read the sensor 502. The value of the parameter read from the sensor may then be transmitted via the interrogation interface 306. Subsequently, the system (not shown) may transmit a command to the electronic tag 501 through the interrogation interface 306 to activate the sensor, and the electronic tag 501 may responsively activate the sensor. According to another embodiment, the system (not shown) may interrogate the electronic tag 501 and send a command to read the sensor 502. The value of the parameter read from the sensor may be used in a logical process by the microcontroller 304, and the microcontroller 304 may activate the indicator 404. Optionally, the microcontroller 304 may further report activation of the indicator to the system (not shown) through the interrogation interface 306. According to another embodiment, the microprocessor 304 may periodically or continuously monitor a parameter with the sensor 502 and then activate the indicator 404 when the parameter reaches a value corresponding to a need for treatment. The activation of the indicator 404 by the microprocessor 304 may thus proceed substantially without interaction with a system through the interrogation interface 306.

The sensor 502 may be configured to detect one or more of a variety of parameters. For example, the detector may be configured to detect one or more of temperature, a protein presence or concentration, an alkaloid presence or concentration, a chemical presence or concentration, an inertia, light presence or intensity, magnetic field presence or intensity, pressure, thermal conductivity, electrical conductivity, moisture, electromagnetic transmissivity, pH, water, fertilizer presence or concentration, herbicide presence or concentration, or fungicide presence or concentration.

Various sensor 502 technologies may be used. For example, the detector may include one or more of a temperature sensor, such as a thermistor, a thermocouple, and/or a bimetal spring; a biosensor, a microarray, an active region, a reactive monolayer; an SPR sensor, a reduction-oxidation binding current sensor, a chemical sensor, an inertial sensor, a light sensor, a magnetic sensor, a pressure sensor, a thermal conductivity sensor, an electrical conductivity sensor, a moisture sensor, a carbon nanotubes sensor, an electromagnetic transmissivity sensor, a piezo-electric sensor, or an electrode array.

The microcontroller 304 may be configured to read the sensor 502 and activate the indicator 404 when a parameter value corresponds to a need for treatment. Alternatively, a decision to activate the indicator 404 may be made by a remote system resource (not shown). For example the interrogation interface 306 may be configured to modulate data corresponding to the parameter during interrogation, and the indicator 404 may be configured to activate responsive to a command received through the interrogation interface 306.

The electronic tag 501 may include a package for at least the sensor circuit and indicator circuit configured for physical coupling to the at least one plant. Alternatively, the indicator 404 may refer to an indicator circuit configured to drive an external indicator.

The interrogation interface may be configured receive data corresponding to at least one plant treatment condition. According to an embodiment, the interrogation interface may be configured to be removed or deactivated after receiving data corresponding to the at least one plant treatment condition. For example, deactivating the interrogation interface may include one or more of shielding the interrogation interface, receiving data via the interrogation interface to lock the interrogation interface, isolating the interrogation interface, disabling the interrogation interface, and/or fusing a portion of the interrogation interface. Accordingly, according to an embodiment, the electronic tag 501 may be configured to activate an indicator 404 when a sensed value or internal data indicates a treatment is needed and substantially without further interaction with an interrogator.

As described above, in conjunction with FIG. 4, an electronic tag 401, 501 may include a reset switch 406 configured to switch the indicator to a non-indicating state. For example, the reset switch 406 may include a human-activatable button. Accordingly, when a worker provides an indicated treatment, the worker may physically reset the electronic tag 401 into a non-indicating state.

Alternatively or additionally, a reset switch may include the sensor 502. For example, the sensor 502 may be configured to sense at least one environmental or plant condition parameter (e.g., before, during, and/or after receiving a treatment). The sensor 502, optionally with cooperation of the microcontroller 304, may then deactivate the indicator 404 when the sensed parameter does not correspond to the plant treatment condition.

For example, a sensed environmental or plant parameter may have a value indicative of a need for treatment which, according to various mechanisms described herein, results in activation of an indicator. Application of a corresponding treatment may cause the sensed environment or plant parameter to change to a "normal" value. The sensor 502 may then sense the normal value and, according to the various mechanisms described herein, the indicator 404 may then be deactivated.

Figure 6:
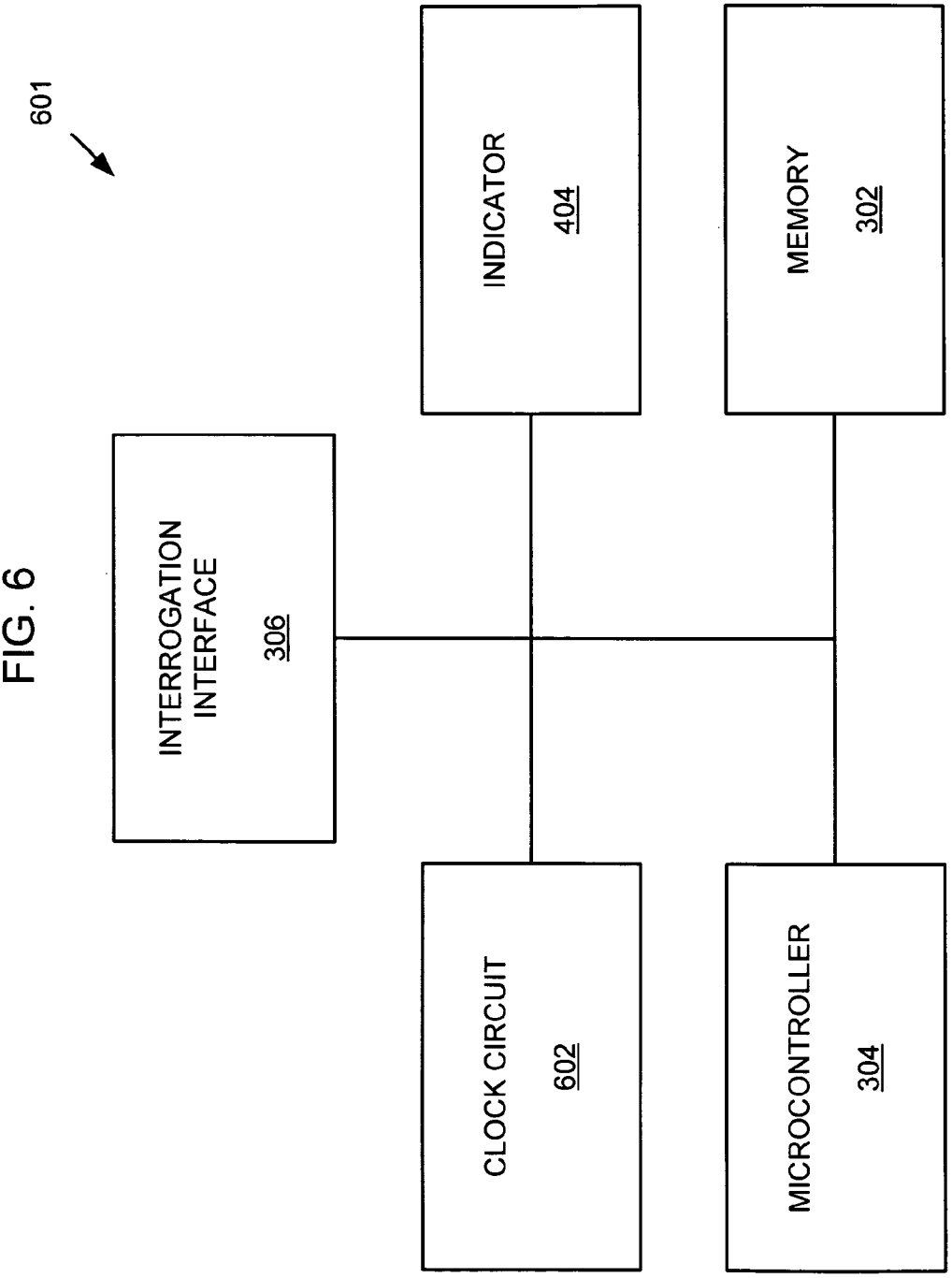
FIG. 6 is a block diagram of an electronic tag for indicating at least one plant including a clock circuit and an indicator, according to an embodiment.

FIG. 6 is a block diagram of an electronic tag 601 including a clock circuit 602 and an indicator 404, according to an embodiment. As indicated above, the electronic tag 401, 601 may include a timing function to track elapsed time between treatments applied to a corresponding plant. The timing may be performed responsive to communication through the interrogation interface 306, such as by transmitting a system tick used to trigger an increment or decrement of a timer value. Alternatively, the electronic tag 601 may include a clock circuit 602 configured to provide timing between one or more treatments independent of receipt of timer commands through the interrogation interface 306.

The clock circuit 602 may periodically output a pulse corresponding to a time increment. The microcontroller 304 may responsively increment or decrement one or more timer values in the memory circuit 302. When the one or more timer values reaches a value corresponding to a treatment interval, the microcontroller 304 may activate the indicator 404 to indicate a need for the treatment.

According to an embodiment, the memory circuit 302 may include plural timer values corresponding to a plurality of treatments. The microcontroller 304 may activate the indicator 404 to indicate a need for one or more of the plurality of treatments.

As described above, the microcontroller 304 may alternatively or additionally increment or decrement timer values in the memory circuit 302 responsive to receiving a signal corresponding to a time increment through the interrogation interface 306

FIG. 7 is a view 701 of an electronic tag 104 including an indicator 702, 704 in a package 312 configured to be coupled to at least one plant, according to an embodiment. For example, the package 312 may represent a plant marker or stake, such as of the type used to indicate a species, a variety, and/or optimal growth conditions in a commercial nursery or garden store.

The package 312 may be configured to present at least one indicator in a position relative to at least one plant where the indicator may be perceived by a user. As described above, an indicator may include at least one of a visible indicator, an audible indicator, a scent generator, and/or a vibrator. In the embodiment of FIG. 7, the indicator includes two visible indicators 702, 704. The two visible indicators may include one or more of liquid crystal indicators, a light emitting diode indicators, electrochromic indicators, or a bistable visible indicator. Alternatively, the visible indicator may include an extendible apparatus or an extendible apparatus with a visible pattern.

The visible indicators 702, 704 may be related to different types of treatments for a plant, different times of requested treatments, and/or different priorities of treatments. For example, indicator 702 may relate to a need for watering the corresponding at least one plant. Indicator 702 may indicate a previous or current temperature that is above or below a recommended range of exposure. The indicators 702, 704 may be configured to provide information related to a type of treatment requested for the plant. The indicators 702,704 may be configured to provide information related to a time of treatment requested for the plant. The indicators 702,704 may be configured to provide information related to a priority of treatment requested for the plant.

The package 312 may be adapted for physical coupling to at least one plant or a plant environment. For example, the package 312 may include one or more of an integral tie, an attached elastic band, a plant stake, a plant label, a plant marker, a plant pot, a decorative pot, a hanging pot, a fiber pot, a peat pot, a coir pot, a plant tray, a seed flat, a starter tray, a plug tray, a propagation tray, a hydroponics container, a biodegradable material, a soil-born capsule, a non-soil potting mix-born capsule, a soil amendment-born capsule, a rooting medium-born capsule, a seed package, a bare root bag, a plant variety tag, a spike, a staple, a root ball wrap, burlap fabric, a seed mat, a fertilizer-born capsule, a chemical-born capsule, and/or a hydroponics-immersed capsule.

As described above, the indicators 702, 704 may be configured to draw power from an interrogation signal. Referring back to FIG. 1, for example, an interrogation field 108 may include electromagnetic energy that may illuminate an electronic tag 104. Alternatively, a contact interrogator may conduct energy to an electronic tag. The energy from the interrogation field 108 or conducted energy may be converted by the electronic tag 104 into energy to drive the indicators 702, 704. For example, the indicators 702, 704 may be configured to draw power through the interrogation interface of the electronic tag 104 when activating and to maintain an indication when the interrogation field 108 is not in communication with the interrogation interface of the electronic tag 104.

For example, the indicia "WATER" may be formed from a pattern including a bi-stable visible indicator such as an array of dipole beads. If the background is white, the indicator 702 may be normally in a state where white sides of the beads are oriented toward a viewer. When activated, the electronic tag 104 may drive the dipole bead array to turn a black side of the beads toward the viewer, and then maintain that position without additional power input. The indicia "WATER" thus appears in a position visible to a user to indicate a need for watering of the at least one corresponding plant. The bi-stable visible indicator may similarly "turned off" by applying power during switching and then maintaining the bead orientation (e.g. white side forward) without application of additional power. The indicia "WATER" may thus substantially disappear to the viewer because the visible sides of the beads are of substantially the same color as the background.

Alternatively, an indicator 404 may continue to draw power from an illuminating interrogation field when the field is not in logical communication with the electronic tag 401. For example, electro-chromic systems are known to maintain color with very low power consumption. The indicator 704 may include an patterned application of electro-chromic material in the shape of the indicia "TEMP". Activation of the electro-chromic indicator 704 may include switching one or more terminals of the electro-chromic indicator into communication with power conversion circuitry in the interrogation interface of the electronic tag 104. When the interrogation field illuminates the interrogation interface, electrical energy received from the field may be rectified and a potential applied across the electro-chromic material in the indicator 404. The electro-chromic material may thus change color from one that is substantially non-contrasting with the background to a color that contrasts with the background to make the indicia "TEMP" visible to a user. The patterned electro-chromic material may remain in an "on" state as long as an interrogation field illuminates the electronic tag 104. If the electrical connection between the interrogation interface and the indicator 704 is persistent, the indicator 704 may become non-indicating when the interrogation field is not present, but then resume indicating when the interrogation field is returned.

Alternatively, the assembly 701 may include a battery, capacitor, or other source of power to power the indicators 702, 704.

Optionally, the electronic tag 104 may include a reset switch 406 configured to switch the indicator to a non-indicating state. For example, the reset switch 406 may include a human-activatable button on the plant marker 312 that may be pressed after application of the required treatment. Accordingly, when a worker provides an indicated treatment, the worker may physically reset the indicator 702, 704 into a non-indicating state.

FIG. 8 is a flowchart showing a process 801 for interrogating one or more electronic tags and providing a human perceptible indication of electronic tags corresponding to plants in need of a treatment, according to an embodiment. Beginning with step 802, an interrogation signal is transmitted to an electronic tag associated with at least one plant. The interrogation signal transmitted to the tag in step 802 may take several forms, as described below. According to an embodiment, interrogation step 802 may include receiving from the electronic tag data corresponding to a plant care condition. According to an embodiment, the interrogation 802 may include transmitting a request for date or time information including a date or time of a recent application of the at least one plant care treatment or a date or time of a scheduled application of the at least one plant care treatment. A response to interrogation from the tag provides the date or time information.

Alternatively, the interrogation 802 may request and receive data from the electronic tag including data corresponding to a physical parameter related to plant care that is or was sensed by the electronic tag. For example, the electronic tag may include a sensing circuit. The interrogation 802 may include receiving data previously read from the sensing circuit and stored in a memory circuit in the electronic tag. Alternatively, the interrogation 802 may include a command to operate the sensing circuit and the data returned from the electronic tag may include data substantially directly from the sensing circuit. For example, the sensing circuit may be configured to sense one or more of temperature, a protein presence or concentration, an alkaloid presence or concentration, a chemical presence or concentration, an inertia, light presence or intensity, magnetic field presence or intensity, pressure, thermal conductivity, electrical conductivity, moisture, electromagnetic transmissivity, water, pH, fertilizer presence or concentration, herbicide presence or concentration, or fungicide presence or concentration.

According to another embodiment, interrogation of the electronic tag in step 802 may include transmitting a system tick to the electronic tag. For example, the system tick may be configured to operate a timer circuit in the electronic tag. The system tick may drive the timer circuit in the electronic tag to increment or decrement toward a value corresponding to a treatment condition. In such case, the interrogation step 802 may include the electronic tag responding with an indication of meeting the treatment condition, such as with a value corresponding to the timer data. For example, when a treatment (e.g., watering) is applied, a countdown timer may be set to a value such as 1440 (decimal) or 5A0 (hexadecimal). A system tick may be broadcast once per minute. At a once per minute countdown rate, the timer would reach zero after one day. When the countdown timer value equals zero, another treatment is indicated.

The process 801 then proceeds to step 804, where it is determined if and/or what treatment may be needed or desirable for the at least one plant. For example, step 804 may include comparing the data corresponding to the plant care condition received from the electronic tag to one or more criteria for applying plant care.

For example, data received from the electronic tag in step 802 may include a date or time corresponding to the most recent administration of a treatment. Step 804 may include determining the elapsed date or time since the most recent treatment, and comparing that duration to guidelines or rules for plant treatment.

According to another example, data received from the electronic tag in step 802 may include a date or time corresponding to a next scheduled treatment. Step 804 may include comparing the scheduled date or time to the current date or time.

According to another example, data received from the electronic tag in step 802 may include data corresponding to a sensed parameter of the at least one plant or the environment of the at least one plant. Step 804 may include comparing the sensed parameter to a range of values corresponding to application of a treatment or to a range of values not corresponding to application of the treatment.

Proceeding to step 806, if a plant treatment is not needed, the process loops back to step 802: According to an embodiment, a next electronic tag corresponding to a different at least one plant may then be interrogated. According to another embodiment, the same electronic tag may be interrogated to determine a need for a different treatment. According to another embodiment, the same interrogation of the same electronic tag may be performed, for example after a waiting period.

According to an embodiment the electronic tag may include logic for determining if plant care is needed. In such a case, step 804 may be performed by the electronic tag prior to performance of step 802 by an electronic tag interrogator.

If it is determined in step 806 that a treatment for the at least one plant is needed, the process proceeds to step 808, wherein a command to activate an indicator is transmitted to the electronic tag through its interrogation interface. The electronic tag then responsively provides a human-perceptible indication of a need for at least one plant care treatment for its corresponding at least one plant.

For example, the human-perceptible indication may include a visible, audible, or vibratory indication. Visible indicators may, for example, include one or more of a liquid crystal display, a light emitting diode, an electrochromic indicator, a bistable visible indicator, an extendible an apparatus such as a spring-loaded or solenoid driven flag and/or cylinder carrying a visible pattern. Audible indicators may, for example, include one or more of a piezo-electric device, a magnetic driver such as a voice coil, or an electrostatic driver. Various vibration drivers may additionally or alternatively act as a human-perceptible indicator.

FIG. 9 is a flow chart showing a process 901 used by an electronic tag to provide human-perceptible indication of a need for one or more treatments by corresponding one or more plants, according to an embodiment. In step 902, an interrogation signal corresponding to a request for data is received via an interrogation interface. For example, the interrogation signal may request data corresponding to at least one treatment for at least one plant.

Proceeding to step 904, the data is transmitted via the interrogation interface. For example the data may correspond to a date or time of application of the at least one treatment. According to an embodiment, the date or time of the application of the at least one treatment corresponds to the most recent application of the at least one treatment. According to another embodiment, the date or time of the application of the at least one treatment corresponds to a scheduled application of the at least one treatment. Such a date or time may correspond to application of a treatment according to a non-random schedule.

According to another embodiment, the data corresponds to one or more sensed parameters indicative of the environment or condition of the at least one plant. The sensed parameter may include one or more of temperature, a protein presence or concentration, an alkaloid presence or concentration, a chemical presence or concentration, an inertia, light presence or intensity, magnetic field presence or intensity, pressure, thermal conductivity, electrical conductivity, moisture, electromagnetic transmissivity, water, pH, fertilizer presence or concentration, herbicide presence or concentration, or fungicide presence or concentration.

Step 904 may include sensing at least one environmental or plant condition parameter and transmitting the data via the interrogation interface.

In step 906, when one or more treatments are needed by the corresponding at least one plant, an indicator activation command may be received via the interrogation interface.

Alternatively, internal logic in the electronic tag may generate an indicator activation command. According to an embodiment, when the electronic tag includes internal logic for generating an indicator activation command, receipt of an indicator command via the interrogation interface in step 906 may be omitted.

For example, internal logic for generating an indicator activation command may include a sensor and the indicator may be activated responsive to a sensed parameter value. Alternatively, the internal logic may include a timer. Receiving interrogation in step 902 may include receiving via the interrogation interface data corresponding to a time or date for applying at least one treatment to at least one plant. This may be used to set a timer to a value corresponding to the time or date. Internal logic or an external command may activate the timer and, when the time tracked by the timer elapses, an indicator may be activated to place the indicator in a condition for human perception.

The timer may include one or more data values in a memory circuit. The timer may be configured to operate by writing one or more new data values to the memory circuit responsive to receipt of a tick via the interrogation interface. Alternatively, the timer may include a clock circuit.

Proceeding to step 908, an indicator is activated to place the indicator in a condition for human perception. According to an embodiment, the indicator may provide information related to a type of treatment requested for the plant. According to an embodiment, the indicator may provide information related to a time of treatment requested for the plant. According to an embodiment, the indicator may provide information related to a priority of treatment requested for the plant.

According to embodiments, activating an indicator may include at least one of activating a visible indicator, activating a liquid crystal display, illuminating a light emitting diode, activating an electrochromic indicator, activating a bistable visible indicator, extending an apparatus, extending a visible pattern, activating an audible indicator, activating a piezoelectric device, activating a magnetic driver, activating a voice coil, activating an electrostatic driver, activating a scent generator, and/or activating a vibrator.

According to embodiments, the treatment may include at least one of planting, cutting, harvesting, grafting, staking, pruning, transplanting, repotting, controlling temperature, controlling root temperature, controlling light intensity, controlling light duration, controlling light schedule, controlling pH, humidification, dehumidification, watering, controlling watering volume, controlling watering duration, controlling watering schedule, fertilizing, determining fertilizer type, pesticide application, determining pesticide type, determining pesticide amount, herbicide application, determining herbicide type, determining herbicide amount, fungicide application, determining fungicide type, and/or determining fungicide amount.

After the treatment is received by the at least one plant, the electronic tag may receive another interrogation command (not shown) to deactivate the indicator in step 912. Alternatively, step 912 may be deactivated after a period of time, whether or not a command is received or a treatment is received by the at least one plant.

The electronic tag may include a reset circuit. In step 910, if a reset is not received, the indicator may remain activated for human perception. If a reset is received, the process may proceed to step 912 wherein the indicator is deactivated (e.g., until the next time a treatment is needed).

According to an embodiment, the reset circuit may include a sensor configured to sense the parameter corresponding to the at least one plant or plant environment. When the sensor circuit senses that the parameter has changed in a manner corresponding to application of the treatment (e.g., if moisture in the soil increases in a manner associated with receiving water), the change in the parameter may provide a reset input and may cause the process to proceed from step 910 to step 912.

According to embodiments, a reset command may be received in association with at least one plant treatment. The reset command may be received via an interface other than the interrogation interface. The reset command may be received via a local input. The reset command may be received via the interrogation interface.

Optionally, the electronic tag may sense activation of a reset switch and responsively reset an internal timer and/or subsequently communicate the act of resetting via the interrogation interface.

According to embodiments the interrogation interface and indicator may be portions of an electronic tag including a package physically associated with the at least one plant.

The foregoing specific exemplary processes and/or devices and/or technologies are representative of more general processes and/or devices and/or technologies taught elsewhere herein, such as in the claims filed herewith and/or elsewhere in the present application.

The foregoing detailed description has set forth various embodiments of the devices and/or processes via the use of block diagrams, flowcharts, and/or examples. Insofar as such block diagrams, flowcharts, and/or examples contain one or more functions and/or operations, each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

In a general sense, the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). The subject matter described herein may be implemented in an analog or digital fashion or some combination thereof.

The reader will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. A typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described components (e.g., steps), devices, and objects and the discussion accompanying them are used as examples for the sake of conceptual clarity and that various configuration modifications are within the skill of those in the art. Consequently, as used herein, the specific exemplars set forth and the accompanying discussion are intended to be representative of their more general classes. In general, use of any specific exemplar herein is also intended to be representative of its class, and the non-inclusion of such specific components (e.g., steps), devices, and objects herein should not be taken as indicating that limitation is desired.

With respect to the use of substantially any plural and/or singular terms herein, the reader may translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

In some instances, one or more components may be referred to herein as "configured to." Those skilled in the art will recognize that "configured to" can generally encompass active-state components and/or inactive-state components and/or standby-state components, etc. unless context requires otherwise.

While particular aspects of the present subject matter described herein have been shown and described, it will be apparent that, based upon the teachings herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the invention is defined by the appended claims. It will be understood that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). If a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.; and may include systems having more than one of any of A, B or C, for example, $A_1$, $A_2$, and B, or A, $B_1$, $B_2$, $B_3$, and C.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

With respect to the appended claims, those skilled in the art will appreciate that recited operations therein may generally be performed in any order. Examples of such alternate orderings may include overlapping, interleaved, interrupted, reordered, incremental, preparatory, supplemental, simultaneous, reverse, or other variant orderings, unless context dictates otherwise. With respect to context, even terms like "responsive to," "related to," or other past-tense adjectives are generally not intended to exclude such variants, unless context dictates otherwise.

While various aspects and embodiments have been disclosed herein, other aspects and embodiments are contemplated. The various aspects and embodiments disclosed herein are for purposes of illustration and are not intended to be limiting, with the true scope and spirit being indicated by the following claims.

What is claimed is:

1. An electronic tag, comprising:
   an interrogation interface;
   a memory circuit operatively coupled to the interrogation interface and carrying data corresponding to at least one plant, the data including a count value;
   an actuatable indicator operatively coupled to at least one of the interrogation interface and the memory circuit; and
   a microcontroller operatively coupled to the interrogation interface, the memory circuit, and the actuatable indicator, the microcontroller configured to,
   modify the count value when time passes; and
   activate the indicator when the count value reaches a limit.

2. The electronic tag of claim 1, wherein the data corresponding to at least one plant includes data corresponding to receipt of a treatment.

3. The electronic tag of claim 2, wherein the data corresponding to receipt of a treatment includes data corresponding to a date or a time when the treatment was last received by the at least one plant.

4. The electronic tag of claim 1, further comprising:
   a clock; and
   wherein the microcontroller is configured to modify the count value responsive to the clock.

5. The electronic tag of claim 1, wherein the microcontroller is configured to modify the count value responsive to a tick received through the interrogation interface.

6. The electronic tag of claim 1, further comprising a timer including one or more data values in the memory circuit, the timer configured to operate by writing one or more new data values to the memory circuit responsive to receipt of a tick via the interrogation interface.

7. The electronic tag of claim 1, wherein the indicator includes at least one of a visible indicator, a liquid crystal indicator, a light emitting diode indicator, an electrochromic indicator, a bistable visible indicator, an extendible apparatus, an extendible apparatus with a visible pattern, an audible indicator, a piezo-electric device, a magnetic driver, a voice coil, an electrostatic driver, a scent generator, or a vibrator.

8. The electronic tag of claim 1, wherein the indicator is configured to provide information related to a type of treatment requested for the plant.

9. The electronic tag of claim 1, wherein the indicator is configured to provide information related to a time of treatment requested for the plant.

10. The electronic tag of claim 1, wherein the indicator is configured to provide information related to a priority of treatment requested for the plant.

11. The electronic tag of claim 1, wherein the indicator is configured to draw power from an interrogation signal.

12. The electronic tag of claim 11, wherein the indicator is configured to draw power through the interrogation interface when activating and to maintain an indication when the interrogator signal is not in communication with the interrogation interface.

13. The electronic tag of claim 1, further comprising:
   a reset switch configured to switch the indicator to a non-indicating state.

14. The electronic tag of claim 13, wherein the reset switch includes a human-activatable button.

15. The electronic tag of claim 13, wherein the reset switch is operatively coupled to the interrogation interface and configured to switch the indicator responsive to a command received through the interrogation interface.

16. The electronic tag of claim 1, wherein the electronic tag includes at least one of a radio frequency tag, a passive radio frequency tag, an active radio frequency tag, a backscatter radio frequency tag, a half-duplex radio frequency tag, a full-duplex radio frequency tag, a touch memory device, a proximity card, a smart card, a photonic tag, a read-only electronic tag, a read/write electronic tag, or a write-once-read-many-times (WORM) electronic tag.

17. The electronic tag of claim 1, wherein the actuatable indicator includes an indicator configured to receive electrical or magnetic activation responsive to a command received through the interrogation interface.

18. The electronic tag of claim 1, wherein the actuatable indicator is configured to receive an activation signal from the microcontroller.

19. The electronic tag of claim 1, further comprising a package configured to physically couple the interrogation interface, memory circuit, and actuatable indicator to the at least one plant.

20. The electronic tag of claim 19, wherein the package is configured to hold the indicator in a position adapted for perception of an indication by a human.

21. The electronic tag of claim 19, wherein the package includes an integral tie, an attached elastic band, a plant stake, a plant label, a plant marker, a plant pot, a decorative pot, a hanging pot, a fiber pot, a peat pot, a coir pot, a plant tray, a seed flat, a starter tray, a plug tray, a propagation tray, a hydroponics container, a biodegradable material, a soil-born capsule, a non-soil potting mix-born capsule, a soil amendment-born capsule, a rooting medium-born capsule, a seed package, a bare root bag, a plant variety tag, a spike, a staple, a root ball wrap, burlap fabric, a seed mat, a fertilizer-born capsule, a chemical-born capsule, or a hydroponics-immersed capsule.

22. A method for identifying at least one plant, comprising:
receiving via an interrogation interface, an interrogation signal corresponding to a request for data corresponding to at least one treatment for the at least one plant, wherein the data includes a count value, wherein the interrogation interface is operatively coupled to a memory circuit carrying the data and a microcontroller that is further operatively coupled to the interrogation interface and the memory circuit, wherein the microcontroller is configured to modify the count value responsive to time passing;
transmitting the data via the interrogation interface;
responsive to the count value reaching a limit, receiving via the interrogation interface, an indicator activation command; and
responsive to the indicator activation command, activating an indicator to place the indicator in a condition for human perception.

23. The method for identifying at least one plant of claim 22, further comprising deactivating the indicator after activating the indicator.

24. The method for identifying at least one plant of claim 22, wherein the data corresponds to a need for the at least one treatment.

25. The method for identifying at least one plant of claim 22, wherein the data corresponds to a date or time of application of the at least one treatment.

26. The method for identifying at least one plant of claim 25, wherein the date or time of the application of the at least one treatment corresponds to the most recent application of the at least one treatment.

27. The method for identifying at least one plant of claim 25, wherein the date or time of the application of the at least one treatment corresponds to a scheduled application of the at least one treatment.

28. The method for identifying at least one plant of claim 22, wherein the indicator provides information related to a type of treatment requested for the plant.

29. The method for identifying at least one plant of claim 22, wherein the indicator provides information related to a time of treatment requested for the plant.

30. The method for identifying at least one plant of claim 22, wherein the indicator provides information related to a priority of treatment requested for the plant.

31. The method for identifying at least one plant of claim 22, wherein activating an indicator includes at least one of activating a visible indicator, activating a liquid crystal display, illuminating a light emitting diode, activating an electrochromic indicator, activating a bistable visible indicator, extending an apparatus, extending a visible pattern, activating an audible indicator, activating a piezo-electric device, activating a magnetic driver, activating a voice coil, activating an electrostatic driver, or activating a vibrator.

32. The method for identifying at least one plant of claim 22, wherein the treatment includes at least one of planting, cutting, harvesting, grafting, staking, pruning, transplanting, repotting, controlling temperature, controlling root temperature, controlling light intensity, controlling light duration, controlling light schedule, controlling pH, humidification, dehumidification, watering, controlling watering volume, controlling watering duration, controlling watering schedule, fertilizing, determining fertilizer type, pesticide application, determining pesticide type, determining pesticide amount, herbicide application, determining herbicide type, determining herbicide amount, fungicide application, determining fungicide type, or determining fungicide amount.

33. The method for identifying at least one plant of claim 22, wherein the interrogation interface and indicator are portions of an electronic tag including a package physically associated with the at least one plant.

34. The method for identifying at least one plant of claim 33, wherein the electronic tag includes at least one of a radio frequency tag, a passive radio frequency tag, an active radio frequency tag, a backscatter radio frequency tag, a half-duplex radio frequency tag, a full-duplex radio frequency tag, a touch memory device, a proximity card, a smart card, a photonic tag, a read-only electronic tag, a read/write electronic tag, or a write-once-read-many-times (WORM) electronic tag.

35. A method for indicating a need for treatment for at least one plant, comprising:
receiving via an interrogation interface data corresponding to a time or date for applying at least one treatment to at least one plant;
setting a timer to a value corresponding to the time or date;
activating the timer; and
when the time tracked by the timer elapses, activating an indicator to place the indicator in a condition for human perception.

36. The method for indicating a need for treatment for at least one plant of claim 25, wherein the interrogation interface, the timer, and the indicator are portions of an electronic tag including a package physically associated with the at least one plant.

37. The method for indicating a need for treatment for at least one plant of claim 36, wherein the electronic tag includes at least one of a radio frequency tag, a passive radio frequency tag, an active radio frequency tag, a backscatter radio frequency tag, a half-duplex radio frequency tag, a full-duplex radio frequency tag, a touch memory device, a proximity card, a smart card, a photonic tag, a read-only electronic tag, a read/write electronic tag, or a write-once-read-many-times (WORM) electronic tag.

38. The method for indicating a need for treatment for at least one plant of claim 35, wherein the treatment includes at least one of planting, cutting, harvesting, grafting, staking, pruning, transplanting, repotting, controlling temperature, controlling root temperature, controlling light intensity, controlling light duration, controlling light schedule, controlling pH, humidification, dehumidification, watering, controlling watering volume, controlling watering duration, controlling watering schedule, fertilizing, determining fertilizer type, pesticide application, determining pesticide type, determining pesticide amount, herbicide application, determining herbicide type, determining herbicide amount, fungicide application, determining fungicide type, or determining fungicide amount.

39. The method for indicating a need for treatment for at least one plant of claim 35, wherein the timer is configured to operate by writing one or more new data values to a memory circuit responsive to receipt of a tick via the interrogation interface.

40. The method for indicating a need for treatment for at least one plant of claim 35, wherein the timer includes a clock circuit.

41. The method for indicating a need for treatment for at least one plant of claim 35, wherein activating an indicator includes at least one of activating a visible indicator, activating a liquid crystal display, illuminating a light emitting diode, activating an electrochromic indicator, activating a bistable visible indicator, extending an apparatus, extending a visible pattern, activating an audible indicator, activating a piezo-electric device, activating a magnetic driver, activating a voice coil, activating an electrostatic driver, activating a scent generator, or activating a vibrator.

42. The method for indicating a need for treatment for at least one plant of claim 35, further comprising:
receiving a reset command; and
deactivating the indicator.

43. The method for indicating a need for treatment for at least one plant of claim 42, wherein the reset command is received in association with at least one plant treatment.

44. The method for indicating a need for treatment for at least one plant of claim 42, wherein the reset command is received via an interface other than the interrogation interface.

45. The method for indicating a need for treatment for at least one plant of claim 44, wherein the reset command is received via a local input.

46. A method for enabling a human-perceptible indication of a need for plant care, comprising:
transmitting an interrogation signal to an electronic tag associated with at least one plant; and
receiving a human-perceptible indication from the electronic tag if at least one plant care treatment is needed.

47. The method for enabling a human-perceptible indication of a need for plant care of claim 46, further comprising:
receiving from the electronic tag data corresponding to a plant care condition determining if plant care is needed; and
if plant care is needed, transmitting a second interrogation signal to the electronic tag corresponding to a command to activate a human-perceptible indicator.

48. The method for enabling a human-perceptible indication of a need for plant care of claim 47, wherein the data received from the electronic tag includes date or time information.

49. The method for enabling a human-perceptible indication of a need for plant care of claim 48, wherein the date or time information includes a date or time of a recent application of the at least one plant care treatment or a date or time of a scheduled application of the at least one plant care treatment.

50. The method for enabling a human-perceptible indication of a need for plant care of claim 47, wherein determining if plant care is needed includes:
comparing the data corresponding to the plant care condition to one or more criteria for applying plant care.

51. The method for enabling a human-perceptible indication of a need for plant care of claim 46, wherein transmitting an interrogation signal to an electronic tag associated with at least one plant includes transmitting a system tick configured to operate a timer circuit in the electronic tag.

52. The method for enabling a human-perceptible indication of a need for plant care of claim 46, wherein the electronic tag includes logic for determining if plant care is needed.

53. The method for enabling a human-perceptible indication of a need for plant care of claim 46, wherein transmitting an interrogation signal includes at least one of interrogating a radio frequency tag, interrogating a passive radio frequency tag, interrogating an active radio frequency tag, interrogating a backscatter radio frequency tag, interrogating a half-duplex radio frequency tag, interrogating a full-duplex radio frequency tag, interrogating a touch memory device, interrogating a proximity card, interrogating a smart card, interrogating a photonic tag, interrogating a read-only electronic tag, interrogating a read/write electronic tag, or interrogating a write-once-read-many-times (WORM) electronic tag.

54. The method for enabling a human-perceptible indication of a need for plant care of claim 46, wherein receiving a human-perceptible indication from the electronic tag includes at least one of receiving a visible indication, receiving an indication from a liquid crystal display, receiving light from a light emitting diode, receiving a visible indication from an electrochromic indicator, receiving a visible indication from a bistable visible indicator, extending an apparatus, extending a visible pattern, receiving an audible indication, receiving an audible indication from a piezo-electric device, receiving an audible indication from a magnetic driver, receiving an audible indication from a voice coil, receiving an audible indication from an electrostatic driver, smelling a scent from a scent generator, or receiving vibration.

* * * * *